United States Patent
Bechtle et al.

[11] 4,072,888
[45] Feb. 7, 1978

[54] METHOD OF CONTROLLING A STEPPER MOTOR

[75] Inventors: Bastian Bechtle, Stuttgart; Claus Schuenemann, Schoenaich; Gisbert Skudelny, Echterdingen; Wilhelm Spruth, Dagersheim; Helmut Weis, Waldenbuch; Volker Zimmermann, Sindelfingen, all of Germany

[73] Assignee: International Business Machines Corporation, Armonk, N.Y.

[21] Appl. No.: 572,593

[22] Filed: Apr. 28, 1975

[30] Foreign Application Priority Data

May 2, 1974 Germany ............................ 2421219

[51] Int. Cl.² ........................................ G05B 19/40
[52] U.S. Cl. ................................... 318/685; 318/696
[58] Field of Search ................................ 318/685, 696

[56] References Cited
U.S. PATENT DOCUMENTS

| | | |
|---|---|---|
| 3,435,314 | 3/1969 | Bradley et al. ............... 318/685 X |
| 3,643,146 | 2/1972 | Ferguson et al. ............. 318/685 X |
| 3,813,592 | 5/1974 | Ryberg ........................ 318/685 X |
| 3,816,656 | 6/1974 | Ludwig ........................ 318/685 X |
| 3,818,261 | 6/1974 | Clarke, Jr. ................... 318/685 X |
| 3,863,118 | 1/1975 | Lander et al. ................. 318/685 |

*Primary Examiner*—Gene Z. Rubinson
*Attorney, Agent, or Firm*—Kenneth P. Johnson

[57] ABSTRACT

Method and apparatus for controlling a stepping motor by storing in a memory, delay time values for the application of motor advance pulses and using motor feedback pulses to access the memory and read out corresponding time delay values after each of which a motor advance pulse is to be generated. The stored time delay values are optimized as to phase angle for the motor advance pulses for acceleration, constant run and deceleration modes of the motor after consideration of motor characteristics and load. Not all feedback pulses have a corresponding time delay value and certain feedback pulses may have two or more time delay values stored therefor. Also disclosed are improved motor coil switching circuits.

13 Claims, 21 Drawing Figures

METHOD OF CONTROLLING A STEPPER MOTOR

BACKGROUND OF THE INVENTION

The invention relates to a method of controlling a stepping motor where, after the starting of the motor by a motor advance pulse, feedback pulses depending on the motor position are used for controlling the motor, as well as to an arrangement for carrying out this process.

Electric stepping motors have a wide field of application in all those areas where precisely specified distances of different lengths have to be covered. Stepping motors are, for instance, used in data processing systems for advancing form sheets in printers, furthermore for driving transport devices of write or read heads in storage devices, and as positioning motors in control systems. A characteristic feature of these stepping motors is that they can be controlled by advance pulses, and that they can perform a discretionary number of step motions upon each applied advance pulse. Similarly to the synchronous motors, stepping motors are designed with distinct poles and execute upon each advance pulse applied a movement which corresponds to a pole pitch.

Two basic methods are known for controlling the stepping motors. In the one method the advance pulses have to be applied to the motor with constant frequency, independently of the motor speed reached or the existing load conditions. In order to make sure that each individual motor advance pulse is converted into an actual movement of the motor by one pole pitch, the frequency has to be low, particularly when starting the motor, for otherwise the individual advance pulses would not be converted into step motions. Consequently, however, the speed of the stepping motor which can be reached is low and the motor is not suitable to be used with high speeds. Such a manner of control is, for instance, described in German Auslegeschrift 1,223,039.

This known German Auslegeschrift also describes the basically different method where on the shaft of the motor a time disk is arranged which according to the movement of the motor emits, upon each individual advance pulse and the corresponding movement by one pole pitch, a feedback pulse. In this known arrangement, this time disk pulse is used for reading out the advance pulses from a pulse storage and for applying them to the driving circuit and the next motor coil. Therefore, in this arrangement known from DAS 1,223,039, the feedback pulse mode is employed where a new motor advance pulse is generated directly from each time disk pulse. This manner of controlling a stepping motor has the considerable advantage that the motor advance pulses can be applied to the motor, when owing to its magnet wheel position reached, the motor can convert a new advance pulse into another step motion. Thus, different load conditions are taken into consideration and the motor accelerates itself. Compared with the open loop mode where no feedback or time disk pulses, respectively, directly generate or excite the motor advance pulses, the starting phase is thus considerably reduced and a much higher final speed is made possible.

For reaching higher final speeds it is for instance known from DAS 2,119,352, to insert, for accelerating the feedback mode operated motor from a lower to a higher speed, once only, between two motor advance pulses an additional pulse as a motor advance pulse, so that the motor reaches a higher final speed. It is furthermore described as known in this DAS that different final motor speeds can be reached in that the lead angle is altered in steps, according to the speed obtained.

For the stepwise conversion of the lead angles, the time disk provided on the motor shaft shows slots differently spaced from the circumference, said slots activating photodetectors, according to different lead angles. The terms lead angle or phase angle relate to the electric angle existing between the supply voltage applied externally to the coils and the internal electromotive force, or the induced magnet wheel voltage, respectively.

For decelerating the stepping motor from higher speed ranges it is known that, as described for example in DAS 2,119,352, the additional acceleration pulse is blanked out again during the delay, i.e., that a feedback pulse is not used for generating an advance pulse for the motor. Thus, the rotary field of the motor precedes the externally applied rotary field so that the delay is thereby achieved. In German Patent Application P 22 49 757.0 it has been suggested that two feedback pulses in the delay phase are not used for forming motor advance pulses. Thus, the motor is decelerated much more quickly from the high speed to lower speeds. In order to ensure a safe deceleration into standstill it has been suggested there that upon reaching a predetermined speed which can be determined owing to the repetition frequency of the feedback pulses, an additional pulse is applied as motor advance pulse, i.e., a so-called hold pulse, keeping the motor on a predetermined lower speed. From this lower speed phase, the motor is then slowed down to standstill by means of stop pulses in order to reach the precise predetermined target point.

Figure 2:
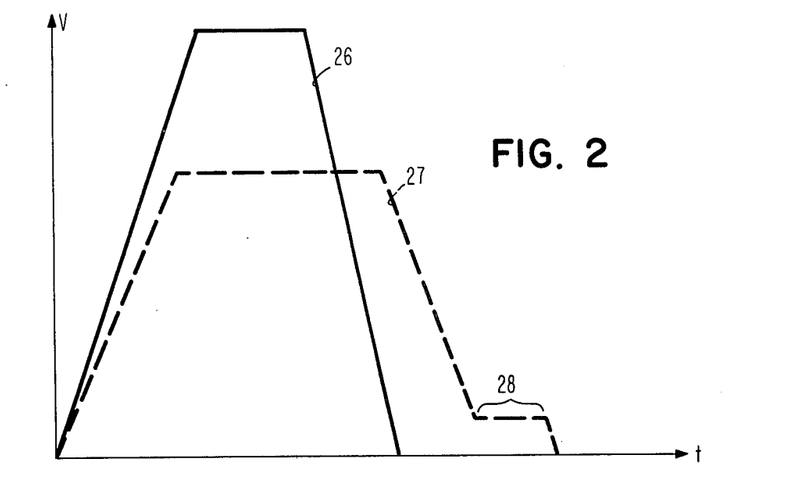
FIG. 2 is a schematic diagram of two different curves showing the motor speed as a function of the time for motors operated in different control methods.

This following mode with a lower speed is shown in FIG. 2 in curves 27 and 28 and it has the disadvantage that, according to the load conditions of the motor, the latter comes to a standstill more or less quickly. The necessary overall time required for reaching the desired position is thus increased compared with the optimum time.

As generally known, the torque of the stepping motor is one of the parameters which gives maximum information on the quality of the motor. This torque depends to a high degree on the motor current and phase angle $\theta$. As specified, phase angle $\theta$ is that electric angle which exists between the voltage applied to the motor coils and the magnet wheel voltage induced by the motor. A desirable feature for each stepping motor is that the torque as a function of the speed or, in other words, of the stepping frequency $f_S$, is as constant as possible and always as high as possible. It is a known fact, however, that the torque decreases with rising frequency owing to the voltage drop, and the torque furthermore depends considerably on the amount of the phase angle. When the phase angle is fixedly determined, as in the ordinary closed loop mode, the phase angle is mechanically fixedly determined by the preceding of the feedback pulses relative to the motor advance pulses, or additionally adjustable by 90° by inserting an acceleration pulse, as shown in curve 29 of FIG. 3 — the torque in most cases is very far from its optimum value. An adaptation of the phase angle in individual steps does not permit, either, the necessary optimization of the phase angle as a function of each individual speed reached.

SUMMARY OF THE INVENTION

The problem of the present invention consists in bringing the stepping motor, under different mode conditions in a minimum of time precisely to that position desired, i.e., to make the motor excecute a precise number of steps in a minimum of time.

The invention is based on the realization that at a specific speed each stepping motor has a torque to which correspond two phase angle values. If this torque existing at a specific speed is the maximum torque, only one value for the phase angle corresponds to this maximum torque. However, of the two phase angle values occurring at a specific torque and a specific speed, only one of the values for the phase angle is that which corresponds to the stable range of the motor, i.e., to the range where the motor does not fall out of synchronism.

It is the object of the present invention to provide a process for controlling a stepping motor where, after the starting of the motor by a start motor advance pulse, feedback pulses depending on the motor position are used for the motor control, to bring the motor safely into its predetermined position, with the certain exclusion of disturbances such as overshooting, omitting or losing a step, and final oscillation in stationary position both under full load and part load conditions. This process should be performed in minimum time. The object particularly consists in running the motor in accordance with different speed, with the optimum value for the phase angle and with the highest possible torque.

This object is solved in that the motor advance pulses, triggered by preceding feedback pulses, are emitted after the expiration of a predetermined delay time, this delay time corresponding to the phase angle value which is associated with the respectively reached speed, number of steps, and the optimum torque.

In accordance with the method as disclosed by the invention the motor is advantageously run with that delay time which corresponds to the respectively corresponding optimum phase angle value as nominal value. The actual phase angle value may slightly vary but is brought back again by this manner of motor control in the direction of the nominal value. Thus the desired number of steps to be covered can substantially be reached in the shortest possible time which, however, can vary within certain limits according to the existing load conditions. It is, at any rate, ensured that the motor is run with the optimum torque which, for safety reasons, does not have to correspond to the maximum torque, at the respective speed reached. This applies to the acceleration range as well as to the deceleration range.

In accordance with an advantageous embodiment of the method according to the invention, the $(n + i)$—th motor advance pulse is triggered by the $n$-th feedback pulse and emitted after the expiration of the delay time corresponding to the associated phase angle value, with the added time equivalent to the $i$-fold step duration, $i$ being an integer and higher than or equal to 1, and $n$ being a continuous integer. According to this embodiment of the method according to the invention, the motor advance pulse is not triggered by the directly preceding feedback pulse, but by the last but one or the last but two feedback pulses, observing again the delay time value corresponding to the associated phase angle value. Practical application of this overlapping kind of process for the generation of the motor advance pulse has shown that an overlapping degree of $i = 2$ keeps the speed variations occurring with different load conditions in relatively narrow limits. Actually, the deviation of this speed from the respective standard nominal speed decreases to the same extent as the overlapping degree increases. It is possible and/or advantageous in practical application to run the motor, when executing a predetermined motor movement, both with and without overlapping of the motor, a change of the degree of overlapping being possible in this method.

According to another advantageous embodiment of the method according to the invention, the individual delay times are called up by feedback pulses from a storage, and from this storage it is possible to call up information for specific fields of motion processes, as start, stop, and transitions for adding and/or suppressing the becoming effective of feedback pulses and/or motor advance pulses.

According to another advantageous embodiment of the method according to the invention, the motor is run by means of the predetermined delay times along a speed-position curve given as the nominal curve, said curve being composed of an acceleration branch, a deceleration branch, and, if necessary, a constant speed range, the associated delay time being used for each point of these curve parts.

The curve according to which one and the same motor is accelerated and decelerated is always constant for each motion mode with a differing number of steps. According to the maximum speed which has been reached, or which is admissible for other reasons, a field of constant speed with constant delay time value, i.e., converted from the constant phase angle value, can be connected to the acceleration range, or generally in those positions where it is wanted, and when the necessary number of steps has been reached the motor is decelerated down to standstill at the desired position in the deceleration range on the optimum curve with the associated optimum phase angle values by using the corresponding associated delay time values. Consequently, the motor is always accelerated and decelerated in the same manner, depending on the length of the distance to be covered or the number of steps to be performed, respectively, possibly also with the inclusion of a range of constant speed. The motor is always run on the optimum nominal curve, irrespective of whether a full load or a part load is applied. In some cases, this may involve certain time losses but it has the predominant advantage that the required position is always precisely reached, and that under full load conditions a precise predetermined target position is ensured in the shortest possible time.

Another advantageous embodiment of the method according to the invention provides that when covering a predetermined distance which differs from case to case and consists of a predetermined number of motor advance pulses the respective speed-position curve is composed of a suitable number of acceleration and deceleration steps, and if necessary, constant speed steps with the respective associated delay time values.

For carrying out the above specified method according to the invention, or its modifications, respectively, the below described arrangement is particularly suitable. This arrangement contains a motion data table where the different delay time values for each individual step are stored, optimized to the respective speed, number of steps and optimum torque of the motor corresponding to the various phase angle values or these phase angle values, respectively, with the added time equivalent of the i-fold step duration. An address logic and phase switching control is provided to which are applied the skip command for the length of the distance to be covered, i.e., the number of steps, and the feedback pulses, and which owing to the skip command and the applied feedback pulses continuously addresses the motion data table and reads out the necessary associated delay time values from the storage, enters them in at least one timing counter within the phase switching control, and, after the expiration of each said counter emits a motor advance pulse. In the address logic and phase switching control, downwards or zero counters can be advantageously employed.

According to still another advantageous embodiment of this arrangement, data for specific motion development field such as start, stop, and transition between the individual speed ranges are stored in the motion data table, beside the delay time values, for adding and/or suppressing the effectiveness of time disk pulses and/or motor advance pulses which can be called up by the address logic and phase switching circuit according to the skip command and the applied feedback pulses.

It is generally known that in stepping motors the current and thus the motor torque decrease considerably with rising step frequency, i.e., with higher speed. For that reason, the coil and the ohmic resistance of the motor are generally designed in such a manner that in higher speed ranges the required torque is still available. This means, however, that in the lower speed range the current rises to a great extent and causes considerable losses. In order to have in a stepping motor a torque as uniform as possible over all ranges of speed and a current which is as uniform as possible, the invention provides a current limiting circuit which can particularly be used to advantage in connection with the above-mentioned method or arrangement, respectively. The use of this current limiting circuit, however, is not restricted to the application for stepping motors operated in accordance with the method according to the invention. This circuit is characterized in that the current applied to a pair of motor coils, independently of the switching state of the coil switches, is switched on and off in the coils in a chopped mode and with a specific frequency, depending on its height, and that in parallel to the switch a diode is arranged in such a manner that current can flow back from the coils into the voltage source. According to another advantageous embodiment, the limits of current values can be differently set in accordance with the existing operating modes of the motor.

In order to permit a further adaptation of the current values to the speed of the motor, each motor coil, according to another advantageous circuit arrangement, can consist of two part coils which according to the speed can be switched individually, serially, or in parallel.

For further embodiments of the method or circuit arrangement therefor according to the invention, reference is made to the claims.

The operation of the method and apparatus according to the invention, and further embodiments that can be advantageously used within the invention, are described below in detail by means of the embodiments shown in the figures.

DESCRIPTION OF THE PREFERRED EMBODIMENTS

Figure 1:
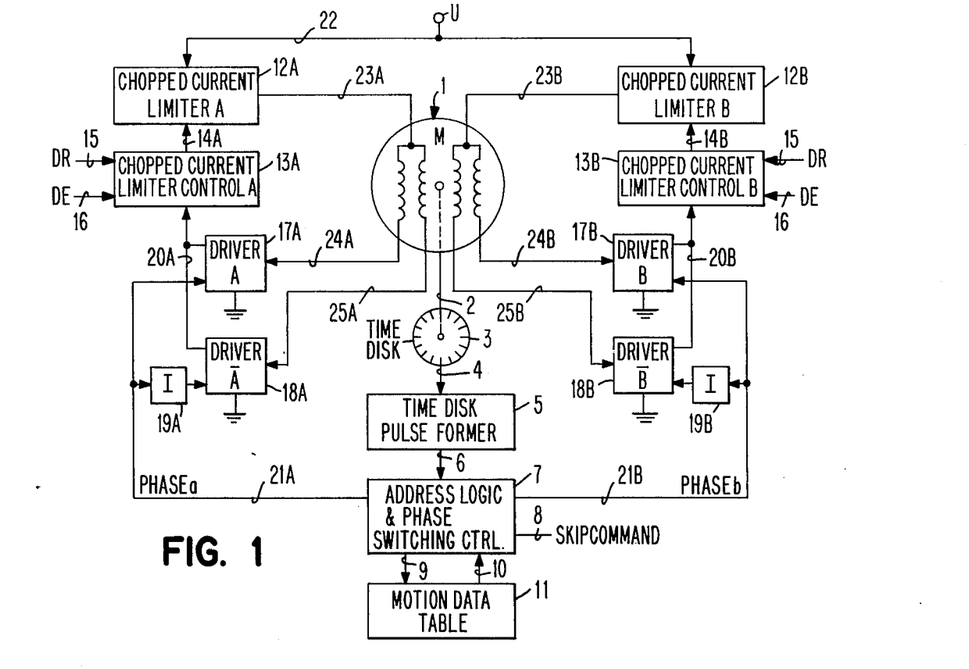
FIG. 1 is a schematic block wiring diagram of the arrangement according to the invention for carrying out the method.

FIG. 1 shows the block diagram of an arrangement with which the method according to the invention can be performed. FIG. 1 shows a motor 1 with four coils which are assembled in pairs to form two coils each. These coil pairs can be bifilarly wound and show a center tap. One coil pair is energized by a driver A, and the other coil pair is energized by a driver B. Motor 1 contains a shaft 2 on which a time disk 3 is fixedly mounted which turns with motor shaft 2 and emits feedback pulses supplying data on the respective position of the motor rotor. The feedback pulses that can be taken from time disk 3 are applied on line 4 to a time disk pulse former 5 emitting at its output 6 time disk pulses TD.

These time disk pulses TD are applied to an address logic and phase switching control 7 to which is applied on another input line 8 a skip command indicating the number of steps to be executed by stepping motor 1. Address logic and phase switching control 7 addresses motion data table 11 on an output line 9, and the latter returns the readout data via an output line 10 to address logic and phase switching control 7. In motion data table 11, those time values are stored which correspond to the different phase angle values at the different speeds of the motor. The time values read out at corresponding addressing are read via line 10 into downward counters or zero counters in address logic and phase switching control 7, said reading into the corresponding counters being executed owing to the triggering by time disk pulse TD on line 6 taken from time disk 3. Each time the counter has reached its zero count a motor advance pulse MA is emitted from which phase switching signals phase *a* and phase *b* are obtained. Another function of address logic and phase switching control 7 is to cyclically convert motor advance pulses MA into control signal pulses phase *a* and phase *b*, and to emit them in the correct order, so that motor 1 runs correctly.

Figure 15:
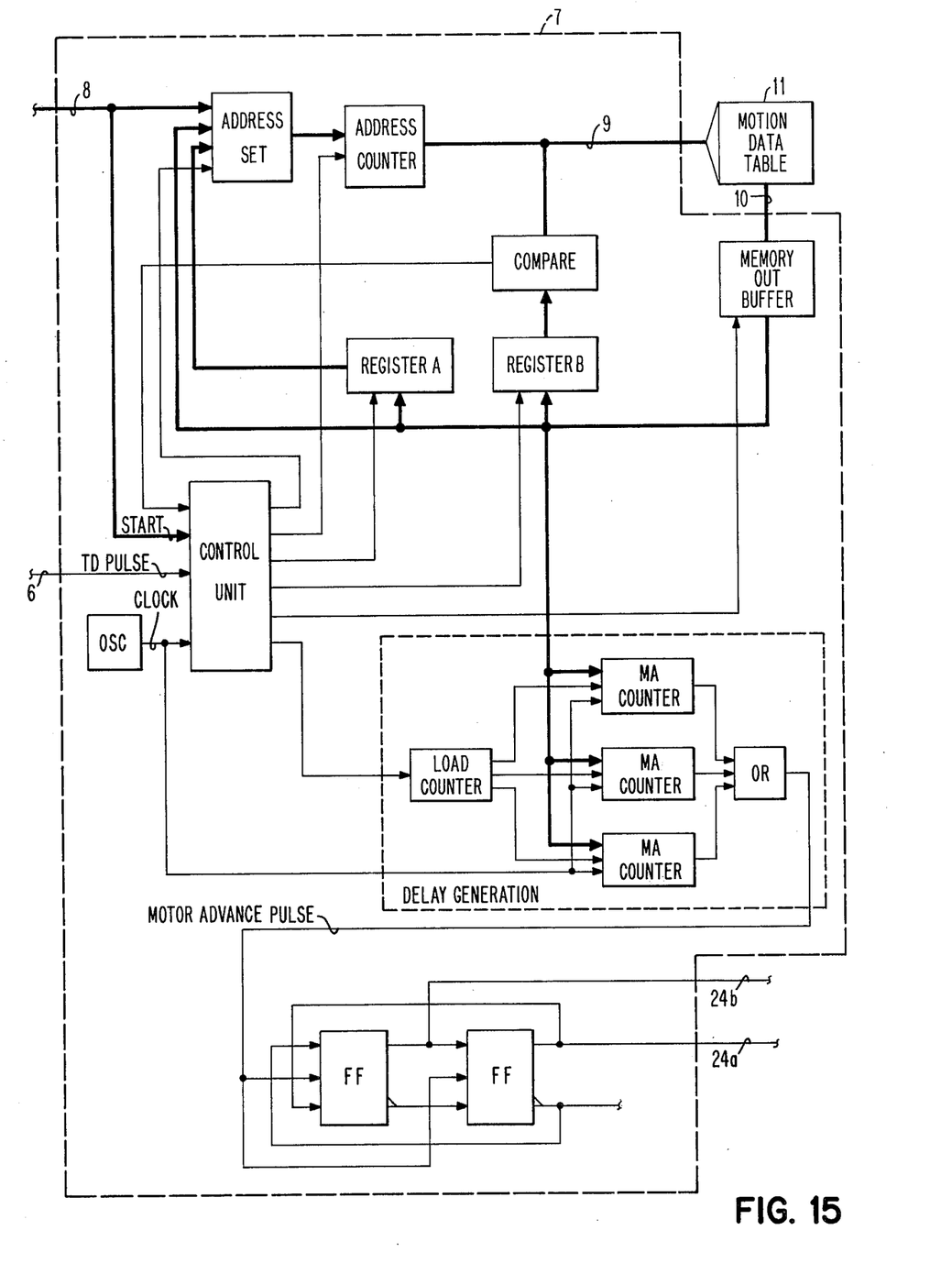
FIG. 15 is a detailed schematic diagram of the Address Logic and Phase Switching Control shown in FIG. 1.

The address logic and phase switching control 7 along with its relationship to motion data table 11 is shown in more detail in FIG. 15. The motion data table 11 can be considered as containing two sections, the control data section and the table of time delay values. The control data section consists of three sets of data for each special skip. These data are contents for Register A, Register B and the start address for the delay time table. Registers A and B also contain addresses with Register B containing the address as to where to leave the acceleration branch 35 (FIG. 5) and Register A containing the address where to enter into the deceleration branch 36. Both addresses point to delay time values in the delay time table.

An example of a skip operation is as follows: assuming a skip command for 48 steps and operation in the double overlapping mode (FIG. 6C), the skip command 48 appears on bus 8 (FIG. 15) and the Start line enables the control unit. This address 48 is applied via Address S and Address Counter on line 9 to motion data table 11. Address 48 forms part of the control data for the first section in the motion data table and contains specific data for Register B, i.e., 25 steps in acceleration, Register A which receives specific data for deceleration, i.e., 23 steps, starting with the 23rd from the last deceleration step on curve 36 (FIG. 5), and the start address of the delay time table in the second section of the motion data table 11. Under control of the set lines, the Control Unit transfers these data into Register B, Register A and into Address S via the Memory Out Buffer. From Address S via Address Counter and line 9 the start address for the delay time table is applied to motion data table 11. Thus the first delay time table value is read via line 10 into the Memory Out Buffer.

The Load Counter is a three step cyclic counter which loads the first motor advance counter with the first delay time value, which immediately starts counting down to zero. The Control Unit increments the Address Counter by 1 and the next addressed delay time value is read into the Memory Out Buffer. Upon appearance of the next TD pulse, the Control Unit steps the Load Counter and enables the second motor advance counter. The delay time value and the Memory Out Buffer is loaded into that counter which also starts immediately to count down to zero from the clock pulses. These steps are accordingly repeated. All three motor advance counters may run concurrently and upon reaching zero each one generates a motor advance pulse. When the Address Counter reaches the same address as stored in Register B, the Compare unit sets its branch line valid. This causes the Control Unit via the set lines to transfer the contents of Register A via Address S into the Address Counter (now containing a new address) and points, via line 9, to the address of the first time delay value in the table for the deceleration within motion delay table 11. The deceleration is continued until the last addressable value is reached upon which no further motor advance pulse is generated.

Figure 5:
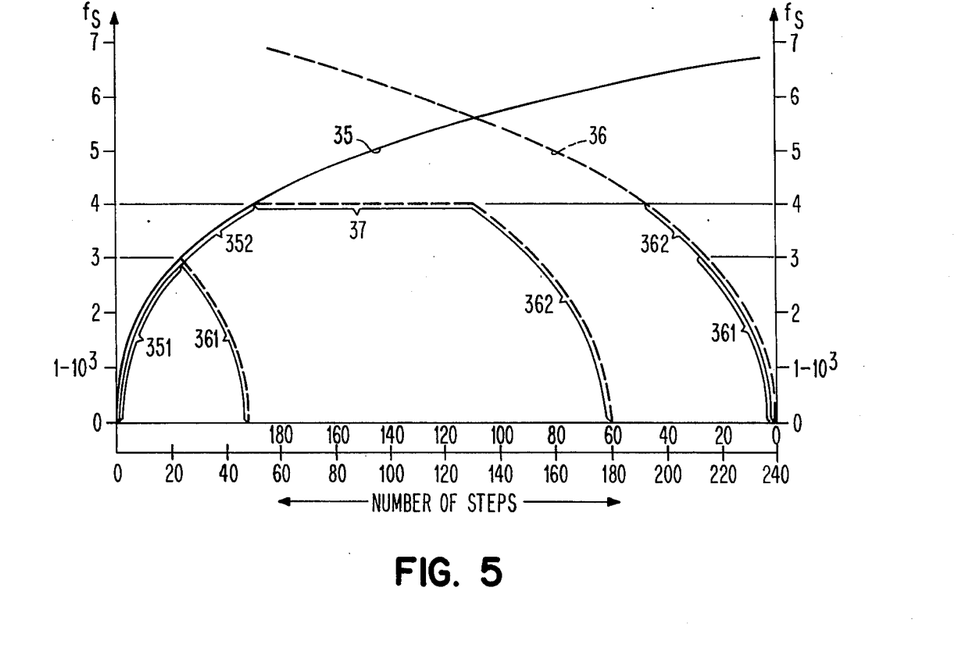
FIG. 5 is a plot of speed curves versus the number of steps for the acceleration range and the deceleration range along which the motor is run, as well as composed curves representing the speed dependence of the motor when performing a predetermined number of steps.

As mentioned above, the Control Unit together with the special control data of motion data table 11 manages the special transition phases such as start, change from acceleration branch 35 of FIG. 5 to constant run 37 and to deceleration 36 for stopping, by generating or suppressing one or two time disk pulses to generate the overlapping mode.

The circuit for the coils of motor 1 in FIG. 1 comprise a chopped current limiter 12A for one pair of coils, and 12B for the other pair of coils, as well as a current limiter control A marked 13A and 13B, respectively. These current limiter controls A and B emit, via lines 14A and 14B control signals to the chopped current limiters A and B. Current limiter controls A and B receive on line 15 and line 16 signals which can be called drive and detent, and which indicate that under drive conditions the value to which the current in the motor coil is to be limited is higher than under detent conditions, this value being lower because the motor is in this state and is ready to restart only if there is a current increase and an application with control signals or motor advance signals, respectively. Consequently, the signals on lines 15 and 16 indicate different maximum current values to which the current limiter control limits the current in the individual motor coils.

Each individual coil of the stepping motor 1 has an associated driver circuit which for part A are marked 17A and 18A, and for part B are marked 17B and 18B. To driver circuit 17A, control signal phase a is applied directly, and to driver circuit 18A control signal phase is applied via an inverter 19A. Accordingly, to driver 17B phase signal phase b is applied directly, and to driver 17B phase signal b is applied via an inverter 19B. Thus, the switching signals to the driver circuit A and B, respectively, are shifted each by electrically 180°.

From drivers A and $\overline{A}$, 17A, 18A, respectively, a line 20A leads to current limiter control 13A. On this line 20A, current limiter control A receives a signal on the value of the current flowing in coil part A. Accordingly, drivers B and $\overline{B}$ are connected to the single drivers 17B and 18B via a line 20B to current limiter control B which is marked 13B. Current limiter control B receives via line 20 the actual current values in drivers B, $\overline{B}$ or their associated coils, respectively.

The current flow via the coils is determined by the phase signals phase a and phase b and their inversions, and moves from the DC voltage source marked U via line 22, the chopped current limiter(s) A or B, respectively, which are marked 12A and 12B, their output lines 23A or 23B, the individual coils with their output lines 24A and 25A, or 24B and 25B, respectively, to driver circuits 17A and 18A, or 17B and 18B, respectively, and from these drivers to the respective other pole which at the driver circuits is marked with the ground symbol, i.e., the supply voltage source. Depending on which of the four drivers is set at this particular moment the current flows from the supply voltage source via the associated coil to the other pole of the supply voltage source U.

Chopped current limiters A and B ensure that the current flowing in the coils is limited to a predetermined value. The chopping is done for reasons of avoiding excessive losses in the switching elements of the current limiters, and it is basically independent of the frequency of the motor advance pulses and phase signals A and B obtained therefrom.

FIG. 2 shows two basic curves following which stepping motors could be operated. Over time t the speed V of the motor is shown. The throughgoing curve 26 is the basically attainable speed-time-curve of the stepping motor which can be obtained with the method according to the invention. Dashed curve 27 is a speed-time-curve which, for example, can be obtained with the method described in German Patent Application P 22 49 757. There the stepping motor is operated in the so-called feedback pulse mode, i.e., the motor advance pulses are obtained from the feedback pulses directly, and are derived therefrom.

In the acceleration branch of the curve, however, it is provided that for reaching a high speed range another pulse is applied to the motor as a motor advance pulse, independently of the time disk pulses, so that the motor accelerates further. In the deceleration branch which is marked 27 two time disk pulses coming from the motor shaft are blanked out and not used for generating motor advance pulses. Thus, the rotary field of the motor precedes the externally applied field to a considerable extent so that the motor decelerates strongly. In practical application, this would be executed down to standstill but it would result in somewhat unprecise predetermined target points, i.e., it is not always possible to reach the positions aimed at with very high certainty. For that reason, it is suggested in this method to hold up the motor in a low speed range in that an additional motor advance pulse is applied to the motor at a predetermined speed, so that it is stopped in its deceleration and that, owing to the low speed range reached and starting therefrom, it can precisely be brought to the required standstill. This phase of low speed range is marked 28 in FIG. 2. A comparison of the two curves 27 and 26 shows that the method suggested in the patent application involves a certain loss owing to the following of a low speed range.

Figure 3:
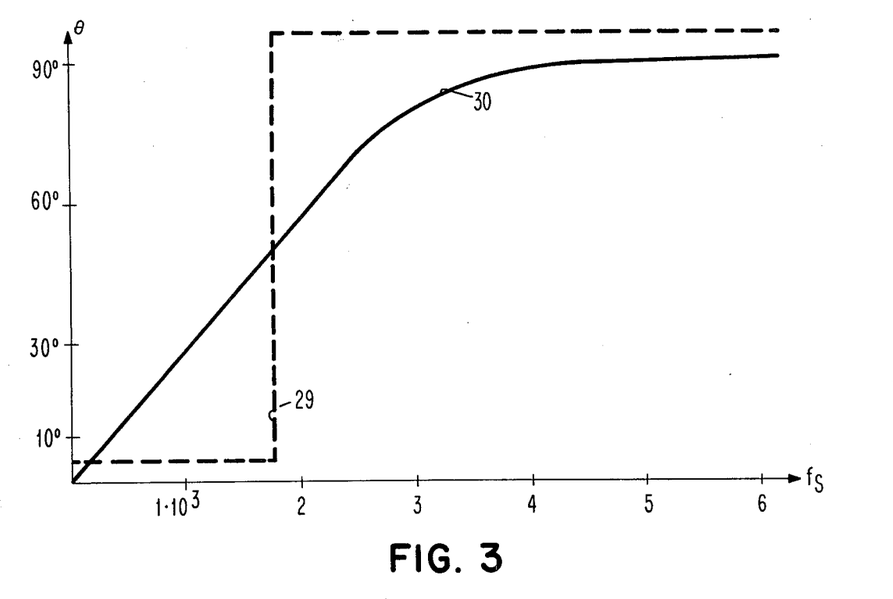
FIG. 3 is a schematic diagram of the dependence of phase angle $\theta$ of step frequency $f_S$, one diagram in accordance with a known method and another of the ideal curve of phase angle $\theta$ over the step frequency.

The torque of a stepping motor depends both on the current of the motor and substantially on phase angle $\theta$. Phase angle $\theta$ is the angle between the externally applied field and the electromotive field generated in the motor, i.e., the so-called magnet wheel voltage. In the known feedback mode, the phase angle is predetermined by the adjustment of the time disk with respect to the motor. This is shown in FIG. 3 for instance by curve 29 which in the lower speed range, i.e., at a step frequency $f_s$ of about 0 to 1750, amounts to a value of 5°. In order to get from this relatively low speed range into a higher speed range it is known, for example, from the abovementioned German Auslegeschrift 21 193 352, to apply to the motor an additional motor advance pulse not derived from the feedback pulses. Thereby, the hitherto existing phase angle is increased by 90°, which is shown in curve 29 by the skip to value 95° at a step frequency of about 1750 steps per second. Subsequently, the phase angle remains constant again. Owing to this reached adjustment of the phase angle, the torque is in most cases very far off its optimum value. The curve marked 30 in FIG. 3 indicates the values for phase angle $\theta$ which continuously increases up to a predetermined step frequency, and which then slowly approaches its optimum value of about 90° at very high speeds. The method according to the invention orientates itself on these different phase angle values, each of these being different for another step frequency or motor speed, respectively, and, triggered by the timing of the time disk pulses TD, it applies to the motor the motor advance pulses after a predetermined delay time, these delay times being calculated from the phase angle values associated with the different speed values.

Figure 4:
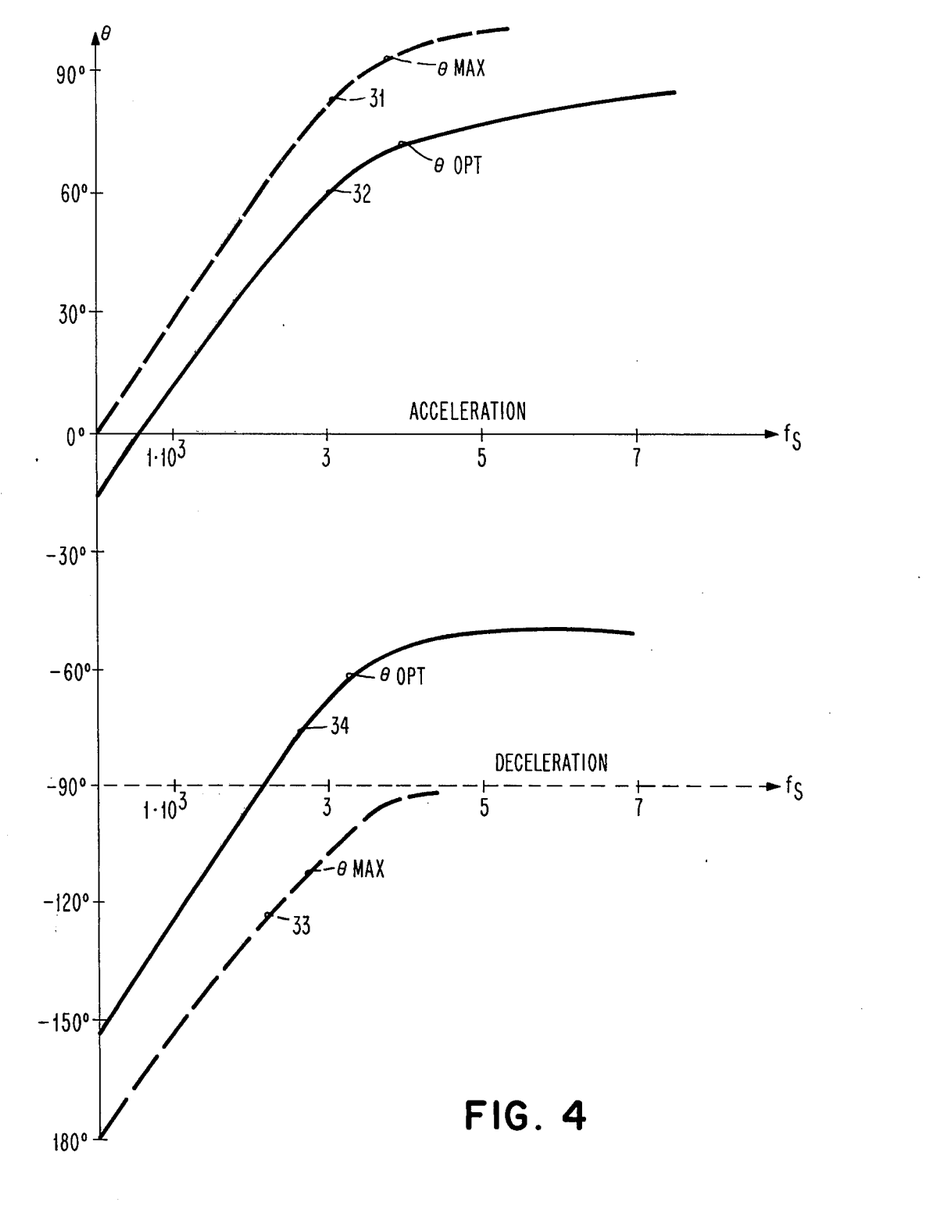
FIG. 4 shows curves of phase angle $\theta$ versus step frequency $f_S$, one diagram for values in the acceleration range, and the other for values in the deceleration range.

FIG. 4 shows in its upper part, describing the motor acceleration range, two curves 31 and 32 representing the phase angle values over step frequency $f_s$. Dashed curve 31 represents the maximum value for $\theta$ which corresponds to the maximum possible torque. The curve beneath marked 32 indicates the optimum values for phase angle $\theta$. This optimum curve is lower than the maximum value for $\theta$ and has been selected for practical application because upon selection of the respective maximum phase angle value, with different load conditions at the motor, the motor could fall out of synchromism. In order to prevent this, the phase angle value has been selected, for example, by 10% or 20% below maximum.

The same considerations apply accordingly for the deceleration range shown in the lower part of FIG. 4. There, the values for angle $\theta$ are negative, the optimum curve being marked 34 and being placed above curve $\theta_{max}$ which is marked 33.

The fact should be mentioned in this connection that at a predetermined speed for a predetermined torque, which is not the maximum torque that can be reached, there exist two values for phase angle $\theta$. With a maximum torque there exists only one value, at a predetermined speed, for the phase angle which in FIG. 4 is marked $\theta_{max}$. However, of the two phase angle values associated with a specific torque, given at predetermined torque and speed, there is only one value where operation is stable and where the motor cannot fall out of synchronism if there is a slight deviation from the torque, which could for instance be caused by different load conditions. Curves $\theta_{opt}$ shown by FIG. 4 correspond to the stable values for phase angle $\theta$.

As already mentioned above, phase angle $\theta$ is defined as that angle by which the externally applied electric field precedes the electromotive force generated in the motor, or the magnet wheel voltage, respectively. This applies to the acceleration range. This can be differently expressed in that angle $\theta$ is defined in such a manner that it is that electric angle by which, upon closed loop mode, the motor advance pulse MA precedes the next time disk pulse TD. This can for instance be seen in FIG. 6A, but there, instead of angle $\theta$, time t corresponding to that angle is given. Angle values can be converted into time values by means of the following equation:

$$t_\theta = \frac{1}{f_s} \cdot \frac{\theta}{90°}$$

By means of the curves for $\theta_{opt}$ as shown in FIG. 4, the times corresponding to the phase angle values can be calculated and recorded on the basis of the above equation for each motor speed.

Motor advance pulses MA are generated by means of the time disk pulses and specific delay times which correspond to the respective phase angle values at predetermined speed, optimized to the optimum torque. The delay time by which the next motor advance pulse MA is delayed upon the occurrence of a time disk pulse TD at a predetermined speed $f_S$, and at a predetermined phase angle $\theta$ or the corresponding phase angle time $t_\theta$, is given by the following equation:

$$t_d = \frac{1}{f_S} - t_\theta = \frac{1}{f_S}(1 - \frac{\theta}{90°})$$

These delay times $t_d$ associated with the different values for phase angle $\theta$ and at different speeds are stored in motion data table 11 in FIG. 1, and serve for the delayed emission of motor advance pulses MA, triggered by the occurrence of time disk pulses TD which are taken from time disk 3.

For each stepping motor and its connected load, or its manner of use, respectively, it is known which speed it reaches after executing a predetermined number of steps. FIG. 5 shows in a double diagram the connection between the number of steps executed and the speed or step frequency $f_S$ reached there. The diagram where the number of steps is counted starting from the left rising towards the right applies with curve 35 to the acceleration range; curve 36, where the number of steps is counted from the right rising towards the left, applies to the deceleration range. The stepping motor is run along these curves, or parts of these curves, a predetermined value for phase angle $\theta$ or a predetermined delay time $t_d$, respectively, belonging to each step frequency, as explained in connection with FIG. 4. The motor motion can be accelerated from an acceleration part, i.e., along a part of curve 35, then run along a range 37 with constant speed and without further acceleration or deceleration, and finally decelerated along a part of deceleration curve 36 to standstill.

This will be explained in detail by two examples for advancing the motor by a different number of steps. According to the first example to be specified, the motor is to advance by 48 steps which, when applied in a printer for advancing the paper, can correspond to a skip over 4 line advances. From the standstill, the motor is accelerated along acceleration curve 35 up to the speed of 3000 steps per second along branch 351. Up to this point, the motor has advanced by 25 steps. In view of the skip command of 48 steps applied to line 8, address logic and phase switching control 7 knows that at this moment, when a step frequency of 3000 steps per second, or 25 advance steps, have been reached there has to be a transition into deceleration curve 36 at exactly the same speed. This corresponds to branch 361 along which the motor is now reliably decelerated to a standstill, by a corresponding switching of the delay times, thus permitting a precise predetermined target point in reaching the 48th step.

A second example describes the case where a number of 180 steps is to be executed and a constant speed phase lies in between. The motor is again accelerated along the generally valid acceleration curve 35, along branch 352 up to a speed of approximately 4000 steps per second, for 52 steps. Subsequently, there follows a constant speed phase 37 for 80 steps, and after having now reached 132 steps the motor, for the remaining 48 steps, is decelerated again to a standstill along curve 362, this curve 362 again representing a section from the general deceleration curve 36.

Each movement of the motor is initiated by a skip command on line 8 (FIG. 1), the skip command indicating the number of steps by which the motor is to be advanced. As explained in the above given examples, the motor is driven for a longer or shorter period of time, according to the number of steps, for a corresponding period of time along generally valid acceleration branch 35, if necessary during a constant speed phase 37 which can be on different levels, and finally along the generally valid deceleration curve 36, and is then brought to a standstill. Thus, there apply the same delay time for all accelerations, and similarly there apply always the same delay times to the deceleration range, i.e., the slowdown phase, irrespective of the respective load applied. These delay times correspond to the nominal phase angle value. The actual values for the phase angle vary around this nominal value, according to the respective conditions on the motor. The transition from the acceleration branch to the deceleration branch always takes place at the point of the same speed reached; this applies also to those cases where a range of a constant speed is inserted between acceleration and deceleration.

Figure 6A:
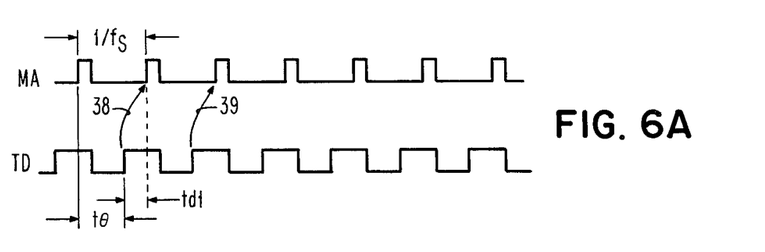
FIGS. 6A, 6B and 6C are diagrams showing the relationship between the motor advance pulses and the time disk pulses with different degrees of overlap.

The delay times after which, following a time disk pulse $t_d$, the next motor advance pulse MA is emitted after the expiration of the associated delay time $t_d$ can differ, according to an advantageous embodiment of the process according to the invention. This will be described in detail by FIGS. 6A, 6B, and 6C. The method which can be called a delayed closed loop mode can be of such a nature that the next motor advance pulse MA, after a delay time $t_{d1}$ associated to the respective phase angle value, is emitted in such a manner that immediately afterwards the next motor advance pulse MA is generated, as shown in FIG. 6A by arrows 38 and 39. Thus, time disk pulses TD control the directly following motor advance pulses MA, i.e., there is no overlapping. So the delay time $t_{d1}$ is smaller than or equal to a step time $1/f_S$ which for positive values applies to phase angle $\theta$.

Figure 6B:
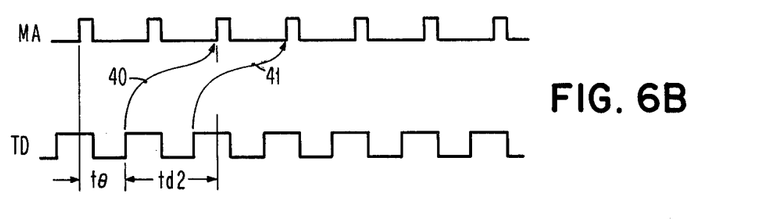
Figure 6C:
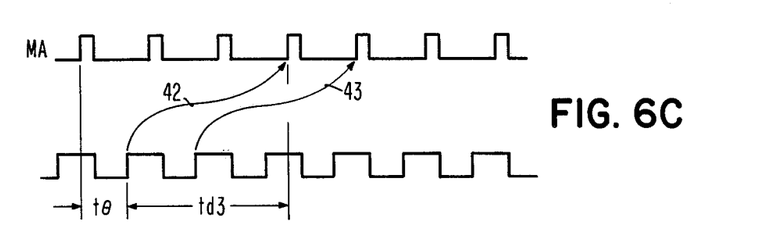

According to another control method a time disk pulse TD can trigger the respective next but one motor advance pulse MA, as shown in FIG. 6B by arrows 40 and 41. In this overlapped control, the overlapping amounting to one step, the deceleration time lies between the time corresponding to the single and the double step frequency and is marked $t_{d2}$ in the figure. Accordingly, following another embodiment of the method according to the invention, a double overlapping can be carried out, i.e., that a time disk pulse TD energizes the respective third following motor advance pulse MA, as shown in FIG. 6C by arrows 42 and 43. The corresponding delay time $t_{d3}$ lies between the time corresponding to the double and threefold step frequency $f_S$ reached.

For the operation in the overlapping mode motion data table 11 shown in FIG. 1 stores the corresponding times resulting from the delay time which corresponds to the nominal value of the phase angle and which is smaller than $1/f_S$, and which comprises the added $i$-fold value of step time $1/f_S$. Address logic and phase switching control 7 includes two or several separate time counters for counting the various delay times $t_d$ simultaneously to 0. Simple overlapping, as shown by FIG. 6B, therefore requires two time counters, and double overlapping, as shown in FIG. 6C, consequently requires three time counters.

With a predetermined step frequency $f_S$, and a predetermined phase angle value $\theta$ occurring in connection therewith, the delay time $t_d$ can be calculated in accordance with the following equation:

$$t_d = \frac{i}{f_S} - t_\theta = \frac{i}{f_S} - \frac{1}{f_S} \cdot \frac{\theta}{90°} = \frac{1}{f_S}(i - \frac{\theta}{90°})$$

$i$ representing the degree of overlapping, and $i = 1$ representing no overlapping, $i = 2$ single overlapping, and $i = 3$ double overlapping.

The advantage of operating the stepping motor with overlapped generation of motor advance pulses MA is that when the load conditions existing at the motor are altered the deviation of the effective speed decreases to the same extent as the degree of overlapping $i$ increases. This will be explained by means of an example. At a specific speed, or at a specific step in a number of steps to be executed, respectively, the motor has a fixedly associated delay time $t_d$. If for instance by decreasing the friction the motor is accelerated from a speed or step frequency $f_{S0}$, respectively, to a speed or step frequency $f_{S1}$, with a simultaneous reduction of the phase angle from $\theta_0$ to $\theta_1$, for a smaller torque demands a smaller angle $\theta$, there applies the following relation:

$$t_d = \frac{1}{f_{S0}}(i - \frac{\theta_0}{90°}) = \frac{1}{f_{S1}}(i - \frac{\theta_1}{90°})$$

which results in the following relation between the two speeds, or the two step frequencies, respectively:

$$\frac{f_{S1}}{f_{S0}} = \frac{i \cdot 90° - \theta_1}{i \cdot 90° - \theta_0}$$

In a practical example using a value $\theta_0 = 40°$ and a reduction of the torque to 50%, with a then associated phase angle value $\theta_1$ of about 20°, there is a speed deviation of 40% at $i = 1$, and with a single overlapping degree with $i = 2$ there is a deviation of 14% only. Thus the speed is advantageously controlled within specific defined limits. This applies to all occurring speeds so that the actual speed of the motor, i.e., the deviation of step frequency $f_S$ depending on the number of steps, differs from the given curve, see FIG. 5, only within given limits when different load conditions exist at the motor. This causes minor changes in the time required for advancing by one and the same distance, or one and the same number of steps, respectively, under different load conditions, but it has the considerable advantage that under all given and possible load conditions for which the respective motor is designed a safe reaching of the respective position is possible without omitting or losing a step.

The above described method where motor advance pulses MA, oriented on time disk pulses TD, are emitted after predetermined delay times $t_d$ applies substantially to acceleration and deceleration. For start, stop, and transition from acceleration to deceleration, or acceleration to constant speed, or from deceleration to constant speed, there apply slightly differing control method and delay times. The required data for adding and/or suppressing the effective ones of time disk pulses TD and/or motor advance pulses MA are also stored in motion data table 11 and are activated by the time disk pulses. By means of FIG. 7 and FIG. 8, these additional facts will be explained for the operation of the stepping motor.

Figure 7:
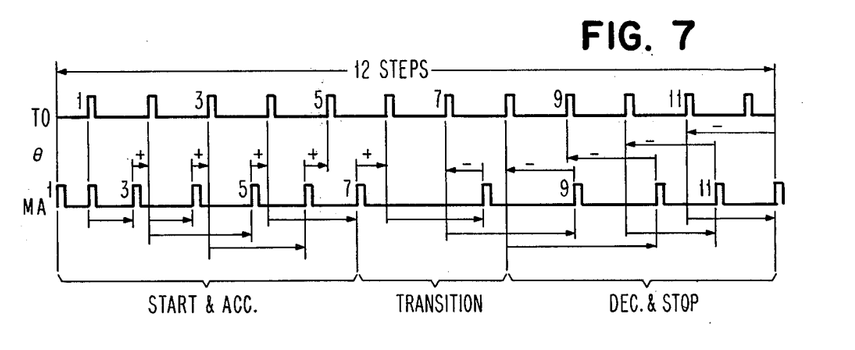
FIG. 7 is a diagram showing the relationship between time disk pulses and motor advance pulses when covering a distance of 12 steps.

FIG. 7 shows a distance of 12 steps to be executed. The upper part shows time pulses TD 1 to 12, the lower part shows motor advance pulses MA, and between both curves angle $\theta$ is given, represented by larger and smaller arrows marked with the plus or minus sign. Upon starting, the first motor advance pulse MA following the start instruction is applied to the motor externally, i.e., without orientation on feedback pulses TD, by address logic and phase switching control 7. The second motor advance pulse MA is then generated directly by the first time disk pulse TD, as in the known closed loop mode where generally the motor advance pulses MA are generated directly from the feedback pulses without delay. In the example of FIG. 7, apart from the direct generation of the second motor advance pulse MA, also the third motor advance pulse is generated from the first time disk pulse TD, in dependence of a delay time corresponding to the phase angle value. The second time disk pulse TD is then used for generating the fourth and fifth motor advance pulse MA, different times having to be considered for this purpose. After the generation of the fifth motor advance pulse the following motor advance pulses are then generated in accordance with the embodiment of the method according to the invention with single overlapping. In the present actual example this means that the third time disk pulse TD occurring after the fourth motor advance pulse generates the sixth motor advance pulse, and that the fourth time disk pulse TD generates the seventh motor advance pulse MA. This corresponds to the process diagram of FIG. 6B.

When the motor is to advance by 12 steps, as shown in the example of FIG. 7, a transition has to be made after the start and acceleration phase into the deceleration and stop phase. For the transition into the deceleration phase, phase angle $\theta$ has to be chosen as negative.

As shown in FIG. 7 relating to the switching from positive to negative angle value the example does not use the fifth time disk pulse for generating another motor advance pulse MA. The first motor advance pulse MA generated in the deceleration range with negative angle value is the eighth motor advance pulse which is generated by means of the sixth time disk pulse TD. The seventh time disk pulse TD then generates the next but one motor advance pulse MA, the one marked 9, the eighth time disk pulse TD generates motor advance pulse 10, or the last but three. The now following time disk pulse 9 is not used for generating a motor advance pulse; motor advance pulse 10 is rather generated in the single overlapping manner by time disk pulse 8, motor advance pulse 11 is generated by time disk pulse 10, and the last motor advance pulse bringing the motor into the required position is generated by the last but one time disk pulse 11.

Figure 8:
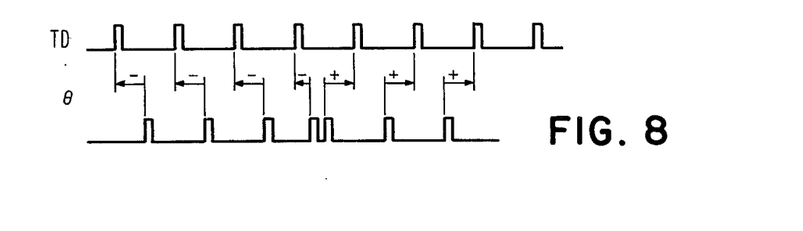
FIG. 8 is a diagram of the relationship between the time pulses and the motor advance pulses in the transition of deceleration to constant speed.

FIG. 8 shows the specific feature that a transition is made from the deceleration phase into a phase of constant speed. This can happen in those cases where for specific reasons the motor is to be run on a predetermined constant speed. There will then have to be a transition from negative angle values for $\theta$ to positive angle values, which is performed by doubling the last motor advance pulse MA in the deceleration phase.

Figure 9:
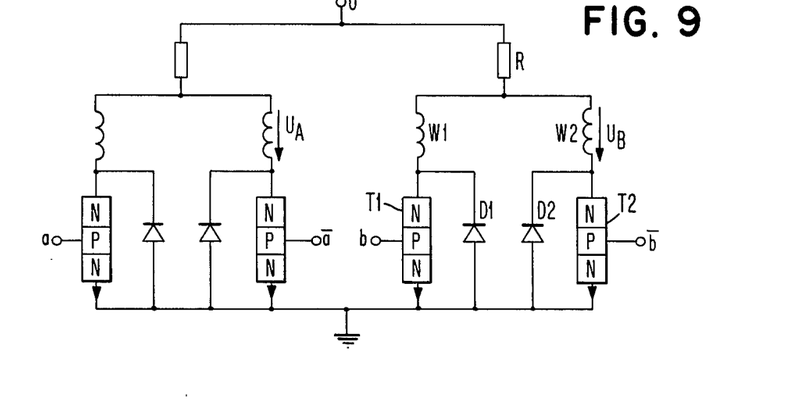
FIG. 9 is a circuit diagram of the motor coils and the switching transistors as well as commutation diodes, with more details than in FIG. 1.
Figure 10:
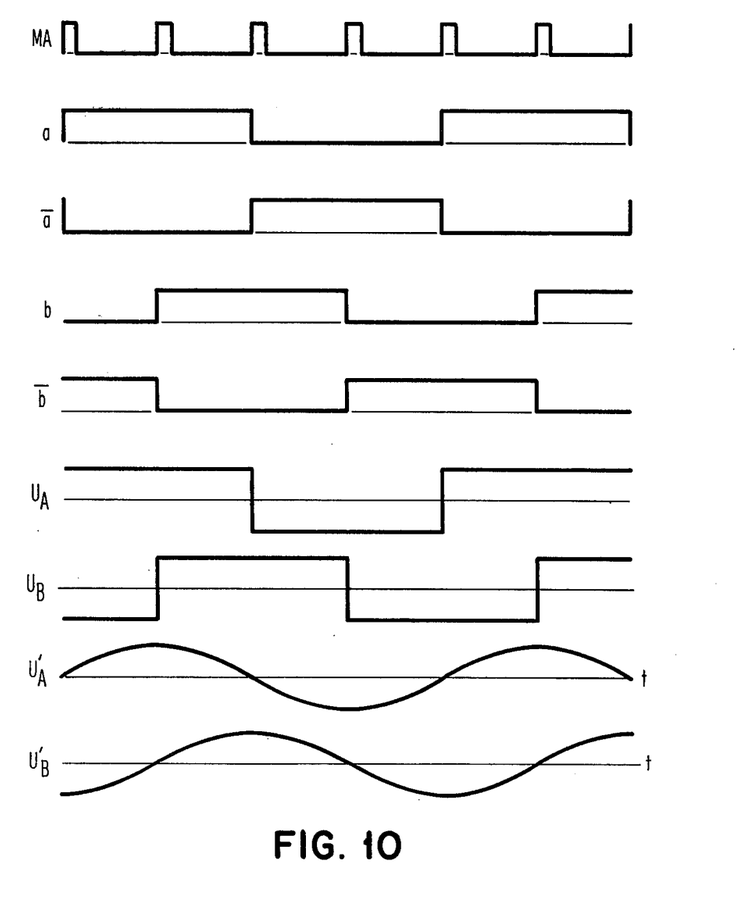
FIG. 10 schematically illustrates the relationship between the motor advance pulses, the switching pulses for the motor switches, and the individual motor voltages.
Figure 11A:
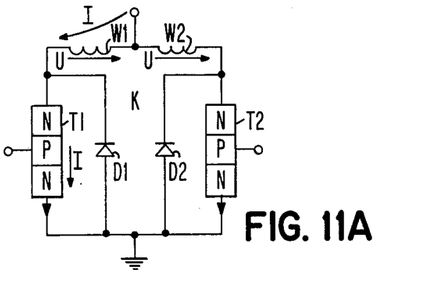
FIGS. 11A, 11B, 11C and 11D show the commutation characteristic of the motor.
Figure 11B:
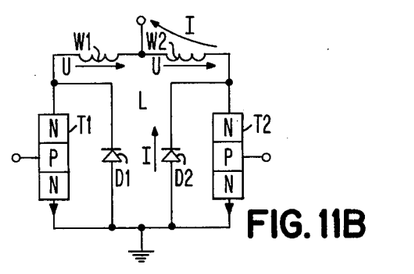
Figure 11C:
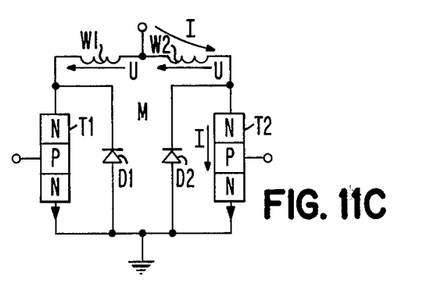
Figure 11D:
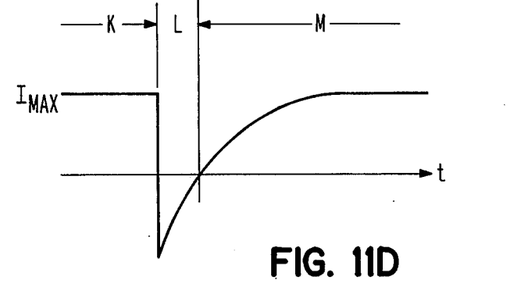

Below, the operation of the motor and the parameters occurring therein will once more be explained with FIGS. 9 and 10, irrespective of how motor advance pulses MA are obtained and in what interval they are applied to the motor as control pulses. FIG. 9 shows a stepping motor with four coils, two respective pairs of coils belonging together. As these two pairs, together with the driver circuits, are of identical structure, FIG. 9 uses reference numbers only for the right-hand half of the motor. From a DC voltage source marked U, current is applied to the two coils W1 and W2 via a serial resistor R. Connected in series to coil W1 is switching transistor T1, and connected in series to coil W2 is switching transistor T2. Arranged in parallel to the forward direction of these two transistors T1 and T2 is a backward diode D1 or D2, respectively, arranged in anti-parallel direction. The parts consisting of switching elements T1 and D1 as well as T2 and D2, can be compared to driver circuits 17B and 18B of FIG. 1. Together with their coils, the driver circuits of both motor halves form two DC-AC converter systems which are controlled by phase switching signals $a$ and $b$. The phase switching signals applied to transistors T1 and T2 are $b$ and $\bar{b}$, as shown in FIG. 10. Accordingly, the other motor half receives a pair of phase switching signals $a$ and $\bar{a}$. With respect to each pair of coils a squarewave voltage $U_A$ on the one hand, and a squarewave voltage $U_B$ on the other is generated in the two motor halves, said voltages being electrically staggered with respect to each other by 90°. This is shown in FIG. 10. The two lower curves of FIG. 10 show the sinusshaped basic waves $U'_A$ and $U'_B$ corresponding to these squarewave voltages.

Each commutation, i.e., the current transition from, for instance transistor T1 to transistor T2 or vice versa, is initiated by the application of a motor advance pulse MA to the commutation network. As shown in FIG. 10, phase switching signal $a$ is set when the first motor advance pulse MA occurs, upon the second motor advance pulse phase signal $b$ is set, upon the third motor advance pulse phase signal $\bar{a}$ is set, the complementary signal $a$ subsequently disappearing, upon the fourth motor advance pulse phase switching signal $\bar{b}$ is set accordingly with the simultaneous disappearance of the complementary signal $b$. Upon the fifth motor advance pulse the cycle restarts with the setting of phase witching signal $a$. This cyclical generation of phase switching signals $a$ and $b$ is executed in address logic and phase switching control 7 shown in FIG. 1 which also generates motor advance pulses MA, as already described above.

Backward diodes D1 and D2 arranged in anti-parallel position to switching transistors T1, T2 of coils W1, W2 serve for reducing the current peak occurring in the commutation processes. Thus, a motor can be operated with fewer windings and with better current utilization, i.e., with higher operating current.

By means of FIG. 11 the process of commutation in individual phases will once more be explained. FIGS. 11A to 11C each show one motor half with the different currents and voltages occurring prior to switching, shortly after switching, and before the next phase switching. FIG. 11D shows the flowing of the current in its various states which are marked K, L, and M and which correspond to the states K, L, and M of FIGS. 11A to 11C. When there is a phase switching signal, compare FIG. 9 with phase switching signals $b$ and $\bar{b}$, it is assumed in FIG. 11A that the current flows through coil W1 and transistor T1. This is to correspond to the state shortly before the occurrence of the phase signal which then renders conductive transistor T2 and, owing to the disappearance of the other phase switching signal renders transistor T1 nonconductive. As in the embodiment shown, coils W1 and W2 are bifilarly wound, the magnetic flux remains at first constant upon the switching of transistor T1 to transistor T2. Current I in the now activated coil W2 flows via backward diode D2 back into the power supply. This corresponds to state L in FIG. 11D, the current taking a negative value here. Due to the height of the externally applied voltage the current finally commutates in the desired manner and flows over the conductive switching transistor T2, and again adopts its maximum value, as shown in FIG. 11D, until the next commutation, through the next phase switching signal at transistor T1, is finally initiated again. As clearly shown in FIG. 11B, voltage U maintains its direction in the coils after the appearance of the phase commutation signal. This voltage is the magnet wheel voltage supporting the commutation process, i.e., the current transistion from transistor T1 to transistor T2. Current commutation is considerably accelerated thereby. Voltage U corresponding to the magnet wheel voltage of the motor increases with rising speed of the motor. By means of this higher voltage U the current commutation is considerably accelerated at higher speeds.

Figure 12:
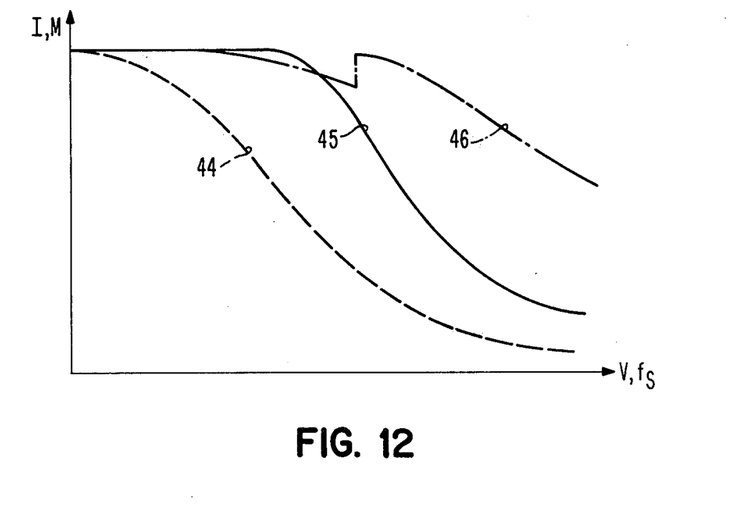
FIG. 12 is a plot of the motor current I or the torque M, respectively, as a function of the speed or the step frequency of the motor.

With increasing speed of the motor, i.e., rising frequency of motor advance pulses MA and linearly rising magnet wheel voltage and inductive resistance, the current in the motor and thus the motor torque decrease. This situation is represented by FIG. 12 showing the current I and torque M over speed V or step frequency $f_S$, respectively. Generally, as also shown in FIG. 9, an ohmic series resistor R is inserted between the coils of the motor and supply voltage source U. The function of this series resistor is to limit the current at a low step frequency to the nominal value when the magnetic wheel voltage of the motor and the inductive resistance are low.

FIG. 12 furthermore shows a curve 45 and a curve 46 indicating that also at higher speeds the current and motor torque M are much higher than in the curve marked 44. This improved flow of the torque of a stepping motor can be obtained by advantageous designs of the stepping motor which are shown in detail in FIGS. 13 and 14. The curve marked 45 in FIG. 12 covers the embodiment with a chopped current limiter, i.e., at lower step frequencies the current is limited to its nominal values in that the DC voltage source U is periodically switched on and off via a switch S corresponding to the chopped current limiter 12 of FIG. 1. This switching on and off process is substantially independent of the frequency and the control of the motor advance pulses applied to the motor, and the phase switching signals generated therefrom.

Figure 13A:
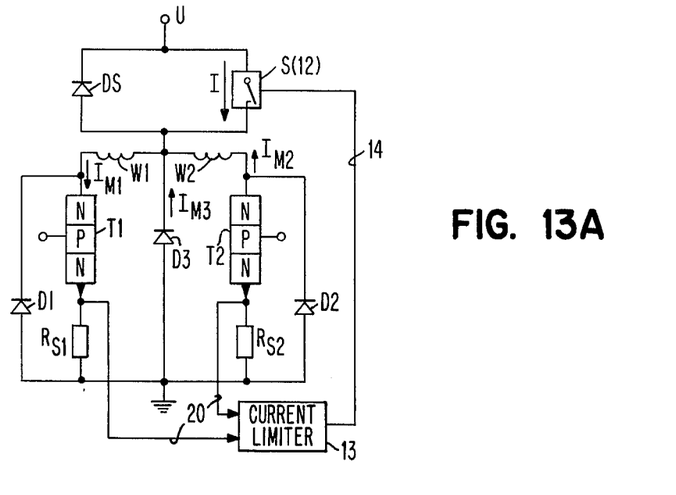
FIGS. 13A and 13B are diagrams of one half of the motor with the current limiter control, and the individual currents occurring in the coils.

Arranged in series with coil W1 switching transistor T1 and an ohmic resistor $R_{S1}$ are provided, said resistor being connected to ground. Correspondingly, switching resistor T2 is arranged in series with second coil W2, and serially thereto a second ohmic resistor $R_{S2}$ is connected to ground. Anti-parallel to the flow direction of the two transistors T1 and T2 one respective diode D1 and D2 is arranged between the connecting point of coils W1 and W2 with the respective associated transistors T1 and T2 and the ground potential. Another diode D3 is arranged between ground potential and the center tapping, similarly anti-parallel to the flow direction of the transistors. The connecting point of the two coils W1 and W2 is, on the one hand, connected to voltage source U via current limiters S or 12, respectively, and on the other via a diode DS which is poled in such a manner that it permits the backflow of current to supply voltage source U, even when switch S is conductive. Switch S is controlled by current limiter 13 via line 14. The current limiter circuit receives its reference values on the height of the currents $I_{M1}$ and $I_{M2}$ by means of the said measuring resistors $R_{S1}$ and $R_{S2}$, which are arranged in series with the respective switching transistors T1 and T2, respectively. These measured values are applied to current limiter 13 via lines 20.

Figure 13B:
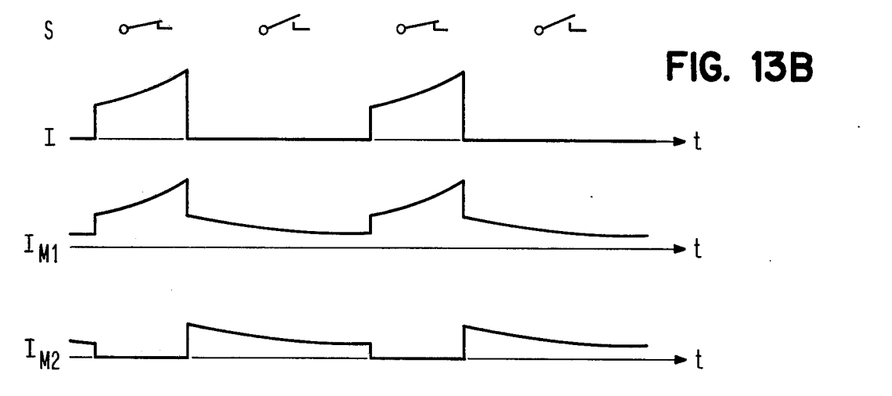

Switch S or 12, respectively, can linearly be either switched on or off by current limiter 13 when the current in the coils exceeds a specific value, or has decreased to a special value, or it can, in a chopped manner, keep constant the current in the coils between predetermined limits. Operation in a chopped mode has the advantage that the losses in switch S are much lower. FIG. 13B shows schematically the flow of the applied current I, depending on the positions of the switch, i.e., whether it is conductive or nonconductive. Furthermore, this diagram shows the flow of currents $I_{M1}$ and $I_{M2}$ flowing in the two coils W1 and W2. In the present example it is assumed that transistor T1 is conductive and transistor T2 nonconductive. According to the position of switch S, when it is conductive, the value for current I and the value for current $I_{M1}$ through coil W1 increases until a specific upper threshold value is reached which is detected by resistor $R_{S1}$. Subsequently, current limiter 13 renders switch S nonconductive, current I accordingly is decrased to value 0 very radidily, current $I_{M1}$ through coil W1 is equally decrased, and current $I_{M2}$ rises, this current flowing via backward diode D2. If the current flowing through coil W1, i.e., current $I_{M1}$, has decreased to a specific value switch S is rendered conductive again, and the process starts again from the beginning. The two backward diodes D1 and D2 which already contribute favorably to commutation have here in the chopped current limiting mode the added advantage and the task to take over the current when switch S is rendered nonconductive. Additional backward diode D3 takes over the current directly after the opening of switch S when the existing stray inductivity tries to delay the transistion of the current into the quasi stationary status. Diode DS, in parallel to switch S, permits the backflow of the current during commutation also when switch S is opened.

Although by means of this current limiter control the current can be kept constant over a larger area the average current decreases with rising step frequency of the motor, as shown in FIG. 12 by curve 45. This is due to the fact that at a higher speed the commutation phase increases within the entire electric semi-period. Thus, the torque decreases, too, but much less strongly than with a fixed ohmic resistance.

Figure 14:
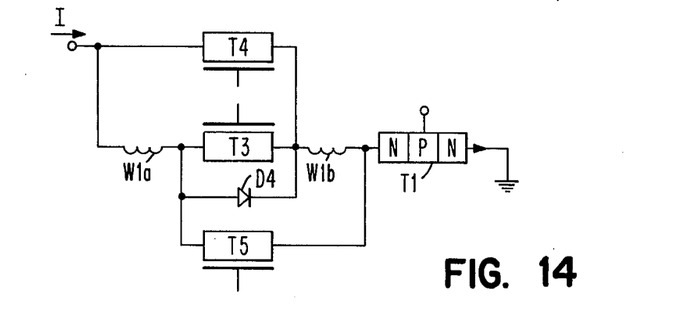
FIG. 14 is a diagram of a possible circuit for the switching of the part coils of one motor coil for improving the current characteristic of the motor under different speeds.

FIG. 14 shows another switching means with which the decrease of current in the coils and thus the decrease of the motor torque with rising frequency can be reduced. According thereto, each coil, for instance coil W1 of FIG. 13A, is divided into two half coils W1a and W1b, and is to be switched by means of a transistor matrix circuit in such a manner in series with switching transistor T1 that either only coil W1a, with nonconductive transistors T3 and T4 is arranged in series with switching transistor T1 over conductive transistor T5, or that only coil half W1b with conductive transistor T4 and nonconductive transistors T3 and T5 are connected in series with switching transistor T1, or that the two coil halves W1a and W1b are arranged in series when transistor T3 is conductive and transistors T4 and T5 are nonconductive, or that the two coil halves W1a and W1b are arranged in parallel when transistor T3 is nonconductive and transistors T4 and T5 are conductive. Diode D4 between the two coil halves W1a and W1b serves for the interruption-free switching from the series arrangement of the two coil halves to the parallel arrangement of the two coil halves, observing in each case the corresponding control for the respective transistors T3 to T5, the skip in curve 46 of FIG. 12 shows the effect of the switching of the circuit of FIG. 14 from series arrangement of the two coil halves W1a and W1b with conductive transistor T3 and nonconductive transistors T4 and T5, on the parallel arrangement of the two coil halves W1a and W1b when transistor T3 is nonconductive and transistors T4 and T5 are conductive.

This switching can be made when a specific speed is reached. In this manner, the current in the coils and thus the torque of the motor can be substantially kept constant over a very large range of speed.

By means of the control method according to the invention for obtaining the motor advance pulses MA in a manner adapted to the respective speed and the corresponding optimum phase angle value it is possible to bring the motor precisely into the required position even with very high speeds, and always with optimum toruqe. There, the current limiter circuit and the specific design of the motor commutation circuit continue to permit the best possible utilization of the motor by means of reaching a high torque, if possible also with very high step frequencies.

In practical use, the generation of the motor advance pulses in address logic and phase switching control 7 in cooperation with motion data table 11 is most easily realized by using a corresponding microprogram. It is just mentioned here that owing to the skip command on line 8 (FIG. 1) giving the amount of steps by which the motor is to be advanced, the microprogram determines the steps to be executed in the acceleration range, possibly in the constant speed range, and in the deceleration range, and it supplies and sets the respective addresses in the motion data table where the individual delay times are stored, that it calls up these times and sets them in the counters so as to generate motor advance pulses MA. The delay time values for each individual motor type which are stored in motion data table 11 can be calculated individually on the basis of simulation programs from the torque of the motor depending on different parameters, as the moment of inertia, the angle of rotation, and the friction constants, and from the electric parameters as the externally applied voltage, the coil current, the ohmic resistance of the coil, and the induced magnetic wheel voltage. However, no detailed reference to these calculations is made here as they are relatively obvious to the expert and have no direct relation to the actual method according to the invention.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of controlling a stepping motor that is generating feedback pulses indicative of position comprising the steps of:
    establishing in a memory a sequence of predetermined time delay values for successive motor advance pulses for a predetermined velocity-position profile for said motor; and
    applying said feedback pulses representation of the current position of said motor to select corresponding ones of said time delay values for generating subsequent motor advance pulses.

2. A method of controlling a stepping motor after initiating movement thereof by using motor feedback pulses indicative of motor position comprising the steps of:
    storing at addressable locations in a memory a series of time delay values for motor advance pulses for obtaining a predetermined motor velocity-position profile;
    addressing said locations in response to the occurrence of said feedback pulses for reading out from said locations said delay values corresponding to said feedback pulses; and
    generating advance pulses for said motor in response to said time delay values read out from said locations.

3. The method according to claim 2 wherein selected ones of said addressable locations have stored therein a plurality of time delay values corresponding to a preselected feedback pulse.

4. The method as recited in claim 2 wherein said series of stored time delay values includes pluralities of said values for acceleration and deceleration of said motor.

5. The method as described in claim 2 wherein only certain of said position feedback pulses have corresponding time delay values stored therefor in said memory.

6. Apparatus for controlling the velocity-position profile of a stepping motor comprising:
    a stepping motor;
    means for energizing said motor to step in increments of displacement in response to motor advance pulses;
    means for generating feedback pulses as said motor is displaced predetermined increments of motion;
    storage means having a motion data table with addressable locations having time delay values stored therein for determining the times at which motor advance pulses are to be applied to said energization means after the occurrence of a feedback pulse;
    control means responsive to a said feedback pulse for addressing said storage means and generating a motor advance pulse for said energization means after a time delay corresponding to said feedback pulse.

7. Apparatus as described in claim 6 further including means for selecting a particular velocity-position profile in said storage means for controlling said motor.

8. Apparatus as described in claim 6 wherein said stepping motor includes a plurality of coils and said energizing means includes current switching means for altering the current supplied to said coils in response to the magnitude of current flow therethrough.

9. Apparatus as described in claim 6 wherein said stepping motor includes a plurality of coils and said means for energizing said coils includes a transistor switch for each said coil and a diode in parallel with each said switch and poled inversely to the current flow therethrough.

10. A current commutating circuit for a stepping motor comprising:
    a pair of coils commonly connected at an end thereof to one terminal of a source of potential;
    individual switch means connected to the opposite ends of each said coil and to the other terminal of said potential source;
    a diode in parallel with each said switch means and connected between said coil and said other terminal of said potential source and inversely poled with respect to current flow in said switch means; and
    an auxiliary diode connected between the commonly connected ends of said coils and said other terminal of potential source.

11. The circuit as described in claim 10 wherein said circuit further includes;
    a control circuit interposed between said commonly connected coil ends and said one terminal of said potential source having a switch means and an inversely poled diode in parallel therewith; and
    variable current limiting means connected to said switch means and responsive to current flow therethrough for actuating said switch means in said control circuit.

12. A coil circuit for a stepping motor comprising:
    a switching means connected to one terminal of a source of potential;
    first and second coil portions having therebetween a first current control means with said first and second coil portions and said current control means connected serially between the other terminal of said source of potential and said switching means; and
    a pair of supplemental current control devices each connected in parallel with a respective coil portion and said first current control device whereby the current in each said coil portion can be controlled to operate said coil portions individually, serially or in parallel.

13. A circuit arrangement as described in claim 12 wherein each said current control device is a transistor and there is provided a diode in parallel with said first current control device between said coil portions poled for current flow in the same direction as said first current control device.

* * * * *